(12) United States Patent
Durrani et al.

(10) Patent No.: US 6,371,507 B1
(45) Date of Patent: Apr. 16, 2002

(54) WORM GEAR DRIVE FOR MODULAR STEERING WHEEL AND AIRBAG COMBINATION

(75) Inventors: Sherylar Durrani, Canton; Larry Rodger Warner, Livonia, both of MI (US)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 08/821,176

(22) Filed: Mar. 19, 1997

Related U.S. Application Data

(63) Continuation-in-part of application No. 08/547,493, filed on Oct. 24, 1995, now Pat. No. 5,692,770.
(60) Provisional application No. 60/003,934, filed on Sep. 15, 1995.

(51) Int. Cl.[7] ............................................. B60R 21/16
(52) U.S. Cl. ...................... 280/728.2; 280/731; 74/552
(58) Field of Search ............................. 280/728.2, 731; 74/552; 403/8, 19, 20, 320, 315; 411/315, 321

(56) References Cited

U.S. PATENT DOCUMENTS

| | | | |
|---|---|---|---|
| 3,264,019 A | * | 8/1966 | Houvener et al. ............. 403/8 |
| 5,544,545 A | * | 8/1996 | Sanders et al. ............... 74/552 |
| 5,584,501 A | * | 12/1996 | Walters ....................... 280/731 |
| 5,584,503 A | * | 12/1996 | Lutz ............................ 280/731 |
| 5,588,337 A | * | 12/1996 | Milton ......................... 74/552 |
| 5,692,770 A | * | 12/1997 | Scharboneau et al. ... 280/728.2 |

* cited by examiner

Primary Examiner—Paul N. Dickson
(74) Attorney, Agent, or Firm—Lonnie Drayer

(57) ABSTRACT

A modular steering wheel and airbag combination includes an airbag assembly, a steering wheel assembly and a separate hub plate. The combination is preassembled as a unitary component which can easily be attached to a steering column shaft. A taper or wedge lock is formed between the steering wheel armature and hub plate. The steering wheel assembly includes a plurality of ribs or spokes extending from an upper rim portion of the steering wheel assembly and a ring portion connecting the spokes to provide structural integrity and support to the steering wheel assembly. The airbag assembly includes a retaining ring as part of an airbag component which provides easy and secure attachment of the airbag component to the hub plate. The inventive steering wheel and airbag combination comprises a structure for securing the combination to a steering column shaft. The structure includes a worm gear and complementary gear. The complementary gear may be a helical gear.

11 Claims, 8 Drawing Sheets

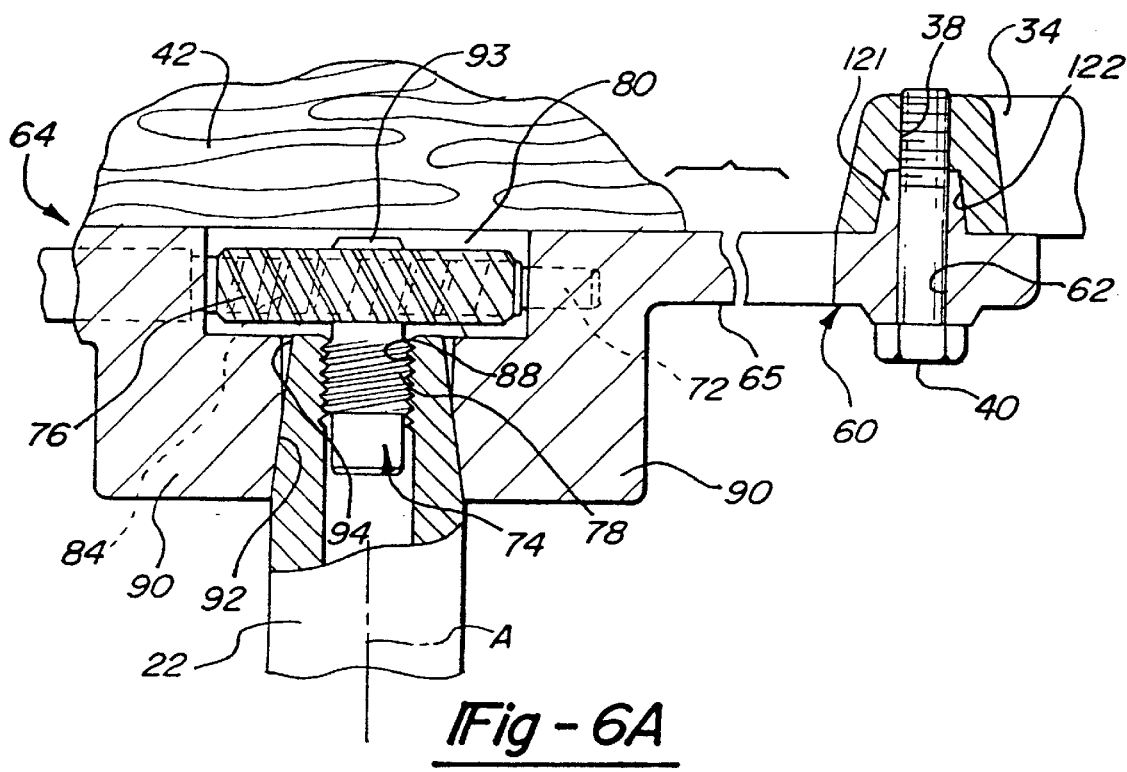
Fig-6A
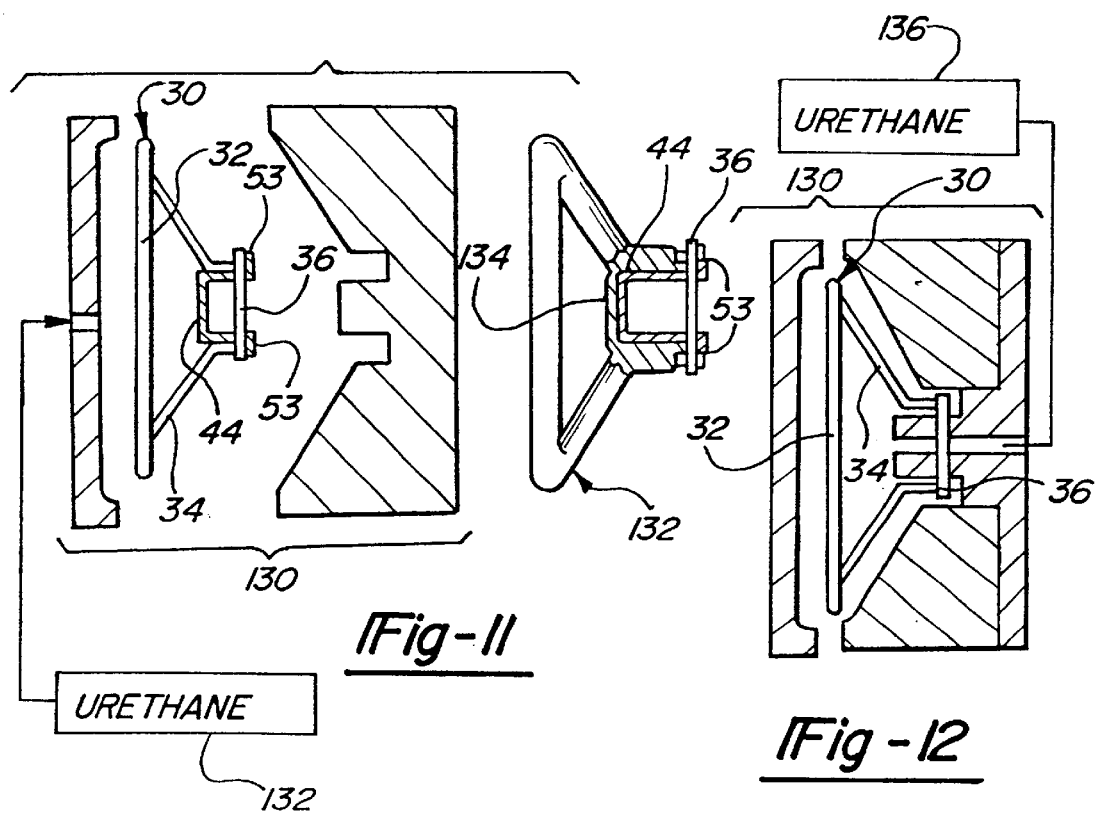
Fig-11
Fig-12

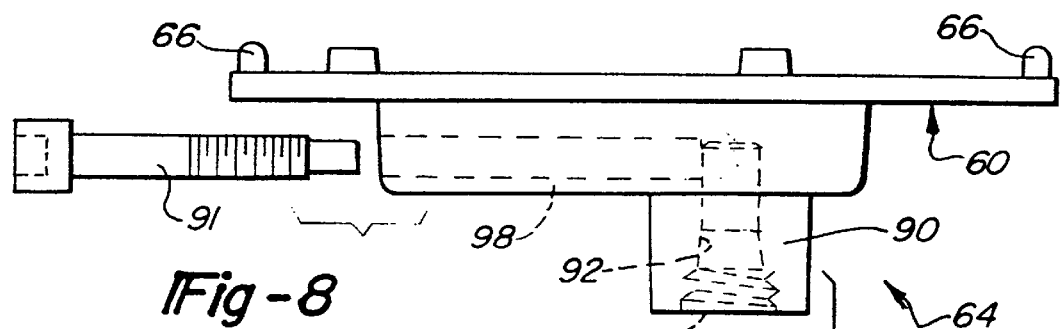
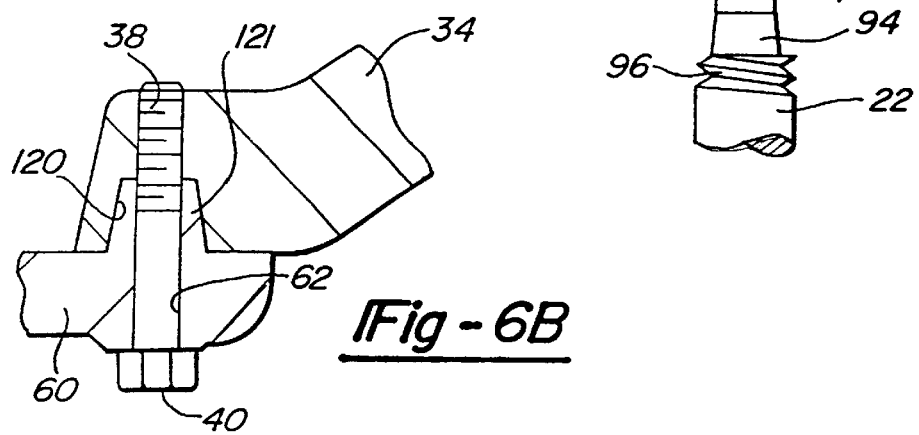
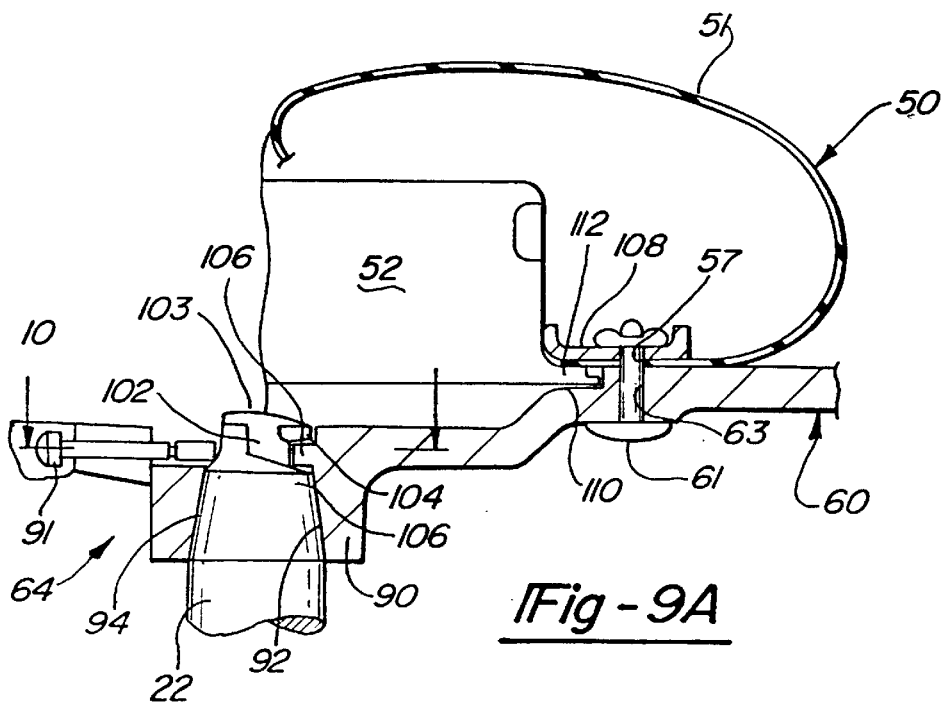

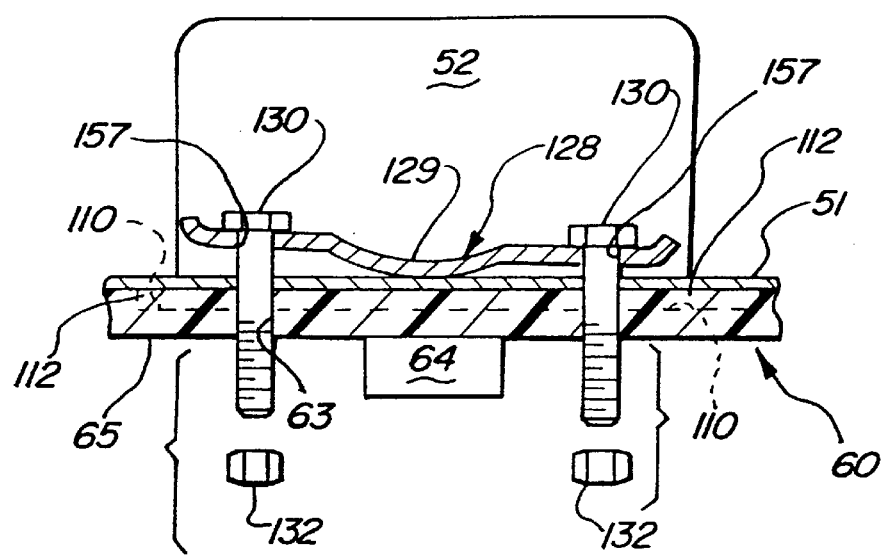
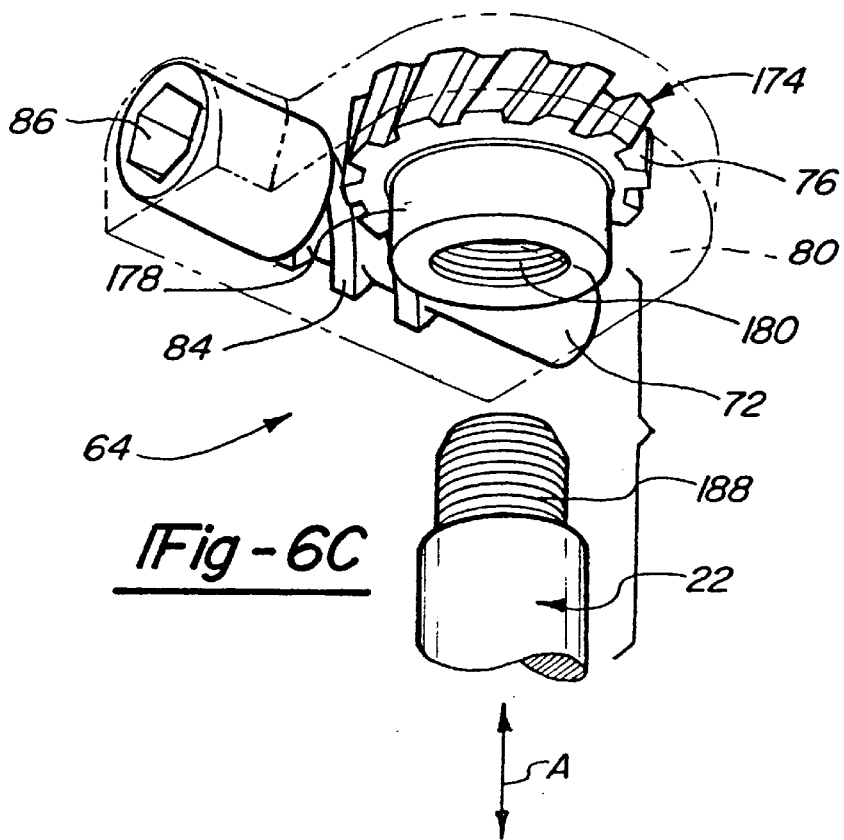

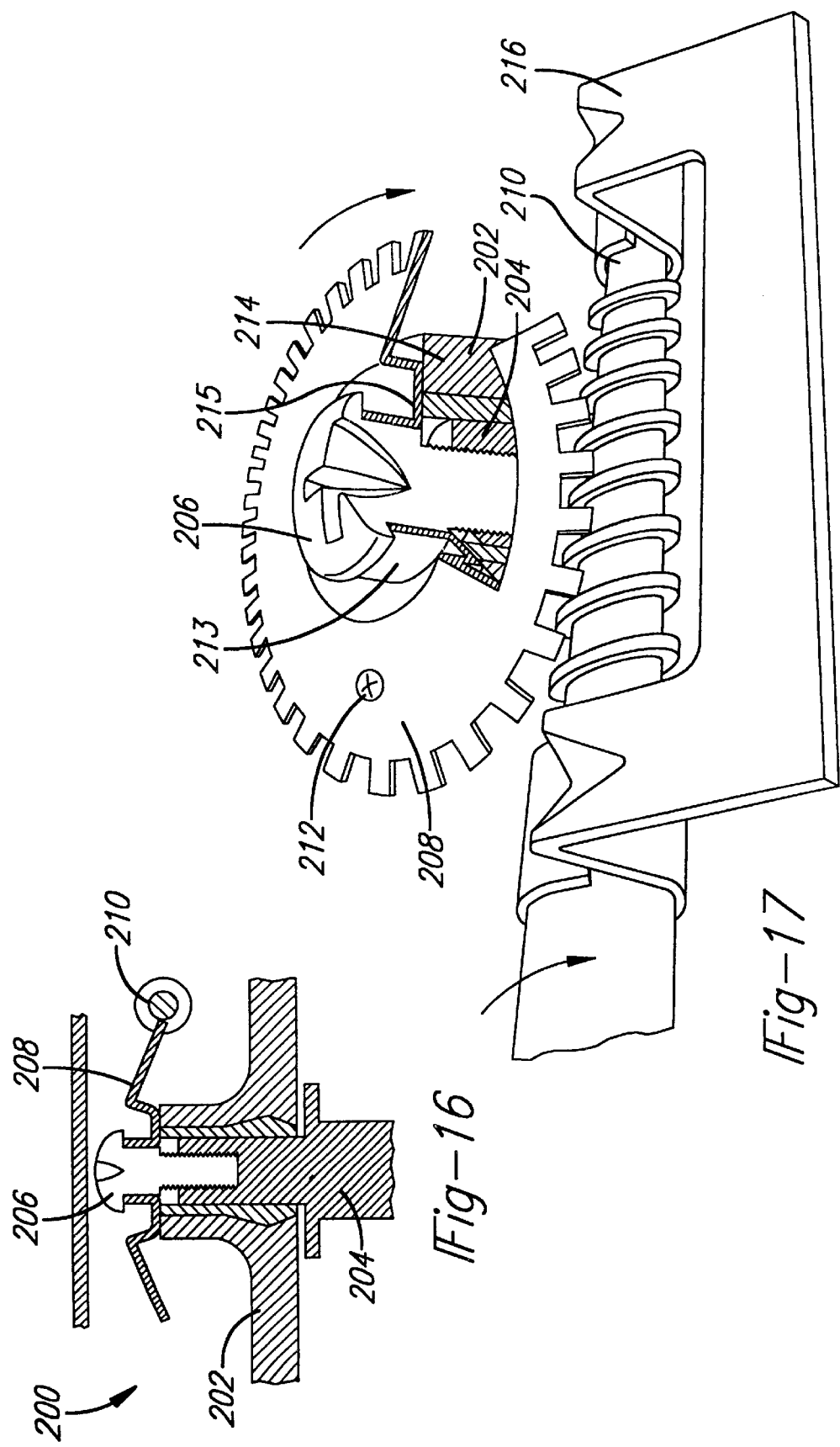

WORM GEAR DRIVE FOR MODULAR STEERING WHEEL AND AIRBAG COMBINATION

This application is a continuation-in-part of application Ser. No. 08/547,493, filed Oct. 24, 1995, now U.S. Pat. No. 5,692,770, which claims priority from U.S. Provisional Application No. 60/003,934, filed Sep. 15, 1995.

BACKGROUND OF THE INVENTION

The present invention relates to a steering wheel and airbag combination. The combination comprises a steering wheel armature and separate hub plate having a structure for attachment to a steering column shaft. The invention also relates to a method of forming a modular steering wheel and airbag combination and a method of assembling a modular steering wheel and airbag combination.

Before the introduction of airbags, steering wheel assemblies could be easily attached to a steering column shaft. Access to the column shaft through a steering wheel assembly was made through the hub of the steering wheel assembly from a front face of the steering wheel assembly.

Airbag assemblies for a driver of a vehicle are typically located on the hub of a steering wheel assembly. Thus, access to a steering column shaft through the hub of a steering wheel assembly has become more difficult. Current methods of attaching a steering wheel and airbag assembly to a steering column shaft require a two step process. A steering wheel assembly is initially attached to a steering column shaft. An airbag assembly is then attached to the steering wheel assembly.

This two step, two-component assembly of steering wheel and airbag assemblies requires a great deal of time and has increased labor costs. Additionally, automobile manufacturers typically obtain the steering wheel assemblies and airbag assemblies from separate suppliers. Due to the two step assembly, the airbag and steering wheel have separate covers. The colors and textures of the two covers must be evenly matched to assure customer satisfaction. Even so, matching the colors exactly has proven difficult.

Another major problem of the current steering wheel and airbag assemblies is the theft of airbag assemblies. Because airbag assemblies are very expensive and can be easily removed from a vehicle, theft of airbag assemblies has risen dramatically. The prior art has made various attempts to address these problems but has been unsuccessful.

SUMMARY OF THE INVENTION

The modular steering wheel and airbag combination of the present invention includes a steering wheel armature and a separate hub plate. The separate hub plate provides a unique way of assembling the steering wheel and airbag combination. An airbag assembly is attached to a hub plate to form a hub plate sub-assembly. The hub plate sub-assembly is then attached to a steering wheel assembly including the steering wheel armature. A structure for securing the steering wheel and airbag combination is accessible from a rear face of the combination. The combination is then positioned over steering column shaft and then secured to the steering column shaft.

One aspect of the present invention includes a steering wheel armature which includes an upper rim portion and structure for attaching the upper rim portion to the hub plate. Preferably, the upper rim portion is essentially circular. The structure may include a plurality of spokes or ribs which extend from the upper rim portion of the steering wheel armature. Bolts attach the hub plate to the armature. In one embodiment a wedge lock is formed between the steering wheel armature and hub plate. The spokes include a seating surface at the opposed end of each spoke and the hub plate includes a plurality of tapered nubs which are forced into the seating surfaces. When the bolts secure the hub plate to the opposed ends of the spokes, a wedge lock is formed between the nubs and seating surfaces. The wedge lock is sufficiently strong that the bolts become unnecessary for retaining attachment after the bolts are originally driven.

The steering wheel armature also preferably includes a lower ring portion which connects the opposed ends of the spokes. The ring provides structural integrity and support to the steering wheel armature. In one embodiment, the hub plate conforms to the size of the ring portion. A plurality of fingers or pins are disposed adjacent lateral edges of the hub plate. A plurality of bores are disposed at lateral edges of the ring portion. Inner and outer airbag covers of the airbag assembly include interlocking tabs, each having a hole. The tabs are disposed between the ring portion and hub plate. The fingers pass through the holes and terminate in the bores in the ring portion. This provides a retaining feature to maintain the inner and outer airbag covers of the airbag assembly essentially within the combination during activation of the airbag component during, for example, a collision.

Another aspect of the invention includes an airbag retaining ring which facilitates assembly of the steering wheel and airbag combination. In a hub plate sub-assembly, an airbag inflator is disposed on a hub plate. An airbag envelope is disposed over the airbag inflator. During activation of the airbag inflator, a significant gas pressure inflation force is exerted to the airbag envelope. A retaining ring is provided as part of the airbag envelope which is disposed around a base of the airbag inflator. The ring is attached to the hub plate with a plurality of fasteners. In a preferred embodiment, a lip extends from a base of the inflator and is disposed between the hub plate and retaining ring. The structure of the hub plate is optimized to take advantage of the retaining ring structure.

The steering wheel and airbag combination also includes an attachment structure for securing the combination to a steering column shaft. The structure is accessible from a rear face of the combination remote from an outer covering facing the driver of a vehicle, preferably from an angle perpendicular to the steering column shaft axis. The attachment structure may include a worm gear and a complementary gear. The attachment structure preferably provides primary, secondary and tertiary retention features.

In one embodiment, the complementary gear is a helical gear having a gear portion, with angled teeth, and a threaded shaft extending from a face of the gear portion. The worm gear is adapted to drive the helical gear to secure the combination to the steering column shaft, thereby providing a primary retention feature. Typically, worm gears are used with gears having curved teeth. In those combinations, the gear may not move axially relative to the worm gear. With the helical gear some relative axial movement is possible. To remove the steering wheel, the worm gear may be reversed to draw the helical gear axially away from the steering column. The helical gear assists in forcing the hub plate away from the steering column shaft by impinging on the back of the inflator. This assists in breaking the "wedge lock" between the hub plate and steering column shaft, described below. The friction and gear ratios between the worm gear and helical gear provide a secondary retention feature which prevents the combination from disengaging from the steering column shaft.

The attachment structure may also include a collar extending from a rear face of the combination disposed around the threaded shaft which protrudes from the rear face. The steering column shaft includes a threaded bore and a tapered outer surface. The threaded bore receives the threaded shaft of the helical gear. An inner surface of the collar engages the tapered outer surface of the steering column shaft. The inner diameter of the collar is less than the maximum width of the tapered steering column shaft. Thus, as the combination is secured onto the steering column shaft, a wedge lock is created between the collar and steering column shaft, thereby providing a tertiary retention feature. This tertiary retention feature provides the most secure attachment between the combination and the steering column shaft of the primary, secondary and tertiary retention features.

Alternative embodiments of the structure for securing the combination to a steering column shaft include a collar having a threaded inner surface, where the steering column shaft includes a threaded outer surface. Another alternative embodiment includes a collar extending from the opposed face of a hub plate with a tooth disposed on an inner surface of the collar, where the steering column shaft includes a circumferential, spiral groove. In either embodiment, the combination is secured to a steering column shaft by placing the combination over a steering column shaft and rotating the combination to a predetermined stop position. A locking bolt is then inserted into a threaded bore essentially perpendicular to the collar.

A method of forming a modular steering wheel and airbag combination is also disclosed. A steering wheel armature is provided. An outer airbag cover may be disposed in a center area appurtenant to the steering wheel armature. A R.I.M. urethane outer covering is disposed around the upper rim portion and spokes of the steering wheel armature and the outer airbag cover reinforcement/substrate. In an alternative embodiment, an outer resin covering and the inner airbag cover are simultaneously molded in an injection mold using a compatible resin. A hub plate sub-assembly is also assembled including a worm gear and helical gear, airbag inflator, airbag envelope and inner airbag cover. The hub plate assembly is disposed within the outer airbag cover and secured to the ring portion of the steering wheel armature. The combined hub plate and steering wheel is then attached to the vehicle.

These and other features of the present invention will be best understood from the following specification and drawings, of which the following is a brief description.

BRIEF DESCRIPTION OF THE DRAWINGS

FIG. 2 is an exploded perspective view of a modular steering wheel and airbag combination in accordance with the present invention;

FIG. 6A is a cross-sectional view of FIG. 5 showing a structure for connecting a steering wheel and airbag combination to a steering column shaft;

FIG. 6B is a cross-sectional view showing, details of the structure attaching a steering wheel armature to a hub plate as shown in FIG. 6A;

FIG. 6C is a perspective view of an alternative structure for connecting a steering wheel and airbag combination to a steering column shaft;

FIG. 8 is a side elevational view of the structure shown in FIG. 7;

FIG. 9A is a partial, cross-sectional view of a steering wheel and airbag combination in accordance with the present invention;

FIG. 9B is a partial, cross-sectional view of an airbag sub-assembly of a steering wheel and airbag combination of the present invention;

FIG. 11 is a partially schematic drawing of a method of forming a steering wheel assembly;

FIG. 12 is a partially schematic drawing of an alternative method of forming a steering wheel assembly;

FIG. 16 shows yet another embodiment of the worm and worm gear structure.

FIG. 17 is a detail of the structure shown in FIG. 16.

DETAILED DESCRIPTION OF A PREFERRED EMBODIMENT OF THE INVENTION

Figure 1:
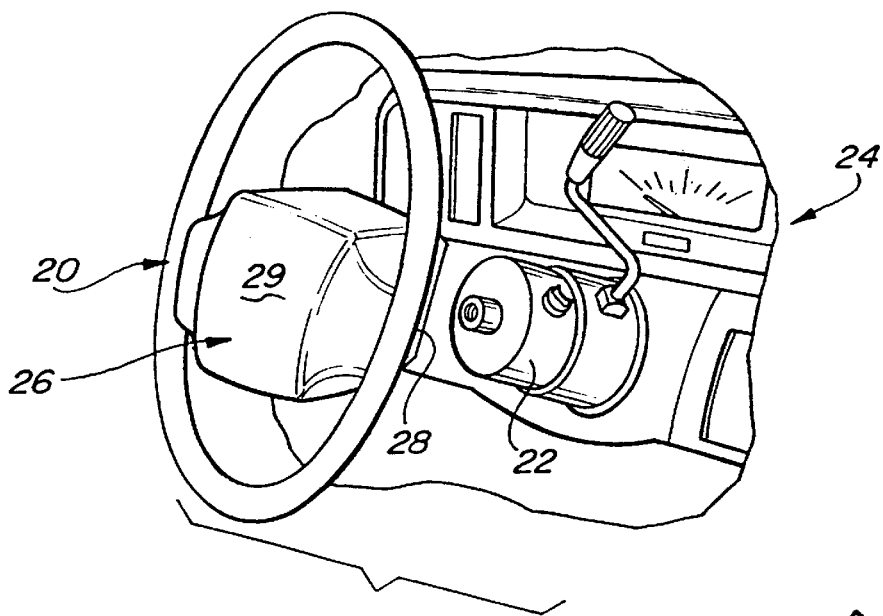
FIG. 1 is a perspective view of a modular steering wheel and airbag combination in accordance with the present invention prior to attachment to a steering column of a vehicle.

As shown in FIG. 1, the modular steering wheel and airbag combination 20 of the present invention is mounted onto a steering column 22 of a vehicle 24. As with all steering wheels, including prior art steering wheels discussed above, the steering wheel and airbag combination 20 rotates in clockwise and counter-clockwise directions to control the direction of vehicle 24 during operation. Steering wheel and airbag combination 20 includes an airbag assembly 26 which is activated during collision of vehicle 24.

Unlike previous steering wheel assemblies, steering wheel and airbag combination 20 is secured to steering column 22 from a rear portion 28 of steering wheel and airbag combination 20. This provides a smooth, aesthetically pleasing exposed front surface 29 facing the driver of a vehicle. The unitary design of the steering wheel and airbag combination of the present invention also reduces the number of steps required to secure a steering wheel and airbag to a steering column of a vehicle, discussed in further detail below.

As shown in FIG. 2, the modular steering wheel and airbag combination of the present invention comprises several individual components, each discussed in detail hereinbelow. The steering wheel and airbag combination of the present invention includes a steering wheel armature 30.

Steering wheel armature 30 is made of known materials, but is preferably made of die cast aluminum and/or magnesium, as known in the art. Armature 30 includes an essentially circular upper rim portion 32 and a plurality of ribs or spokes or arms (hereinafter "spokes") 34 which are four in number. Spokes 34 extend from spaced points of upper rim portion 32. Depending on the particular steering wheel design, combination 20 preferably includes from two to four spokes. Spokes 34 may comprise, in the alternative, plates which extend from upper rim portion 32. Such plates may be casted with or welded to upper rim portion 32 and may be significantly wider than spokes 34 shown in FIG. 2. Spokes 34 provide structure for connecting upper rim portion 32 to a separate hub plate, described in further detail below. At an opposed end of each spoke 34, remote from the upper rim portion 32, are threaded holes 38 which threadably receive bolts 40 in a fully assembled steering wheel and airbag combination. Upper rim portion 32 is generally known as the rim of a steering wheel.

Steering wheel armature 30 also includes a lower ring portion 36 which connects the opposed ends of spokes 34. Lower ring portion 36 provides structural integrity and support to steering wheel armature 30. Ring portion 36 also maintains spokes 34 at fixed points relative to upper rim portion 32 and to each other. A plastic resin cover is preferably molded over steering wheel armature 30. The lower ring portion 36 holds spokes 34 at a desired position during this molding process. A plurality of bores 70 are formed along lateral edges of ring portion 31. Each bore receives a free end of a finger 66 formed on a hub plate 60, described below. As shown in FIG. 2, lower ring portion 36 has a rectangular shape. Lower ring portion 36, however, may have any desired shape, including circular, triangular, or elliptical, to accommodate a particular steering wheel design.

The modular steering wheel and airbag combination 20 also includes an airbag assembly 42. Airbag assembly 42 includes an outer airbag cover 44, a horn switch 46, an inner airbag cover 48, an airbag component 50 and an airbag inflator 52. Outer airbag cover 44 accommodates the other components of the airbag assembly and, an as shown in FIG. 2, has a pair of generally parallel spaced lateral walls 47, a second pair of generally parallel spaced lateral walls 49 and an upper wall 51 connecting the upper lateral edges of walls 47 and 49. As shown in FIG. 2, the walls 47 may have cut outs or may be eliminated, particularly where no tabs are included in such walls. Walls 47 are generally perpendicular to walls 49. Walls 49 include a plurality of tabs 53 extending from a lateral edge adjacent the base of outer cover 44, remote from wall 51. In assembled form, ring portion 36 of steering wheel armature 30 is disposed around the base of outer airbag cover 44 adjacent tabs 53. Walls 47 and 49 extend from ring portion 36 toward upper rim portion 32 of steering wheel armature 30.

Horn switch 46 is of the type known in the art and controls the horn function of a vehicle. In one embodiment, horn switch 46 activates a vehicle horn when an operator of a vehicle depresses outer surface 29 and, thus, horn switch 46. Horn switch 46 is disposed between walls 51 and 58 of outer and inner airbag covers 44 and 48, respectively.

Because the horn of the vehicle is activated by depressing horn switch 46, inner airbag cover 48 must provide some resistance against horn switch 46 during an operator's pushing force. Thus, inner airbag cover 48 is made of a stiffer, less resilient resin material. As with outer airbag cover 44, inner airbag cover 48 must accommodate certain components of air bag assembly 42, including an airbag envelope 50 and inflator 52.

In the embodiment shown in FIG. 2, inner airbag cover 48 includes a pair of generally parallel spaced walls 54 and a second pair of generally parallel spaced walls 56. As shown in FIG. 2, walls 54 may have cut outs, particularly where no tabs are included in such walls. Walls 56 are essentially perpendicular to walls 54. Inner airbag cover 48 also includes an upper wall 58 connecting upper lateral edges of walls 54 and 56. Horn switch 46 overlays the outer surface of upper wall 58. Walls 56 include a plurality of tabs 55 extending from opposed lateral edges of walls 56 remote from upper wall 58 of inner airbag cover 48. Inner airbag cover 48 fits within outer airbag cover 44 with horn switch 46 sandwiched between walls 51 and 58. Walls 56 of inner airbag cover 48 lie adjacent walls 49 of outer airbag cover 44. Likewise, walls 54 of inner airbag cover 48 lie adjacent walls 47 of outer airbag cover 44.

Airbag component 50 and inflator 52 are of the type well known in the art and are commercially available from airbag manufacturers including TRW and Morton International. During a collision of vehicle 24, airbag inflator 52 is activated and inflates airbag envelope 51. A gas fills airbag envelope 51 expanding the airbag outwardly away from ring portion 36 toward the driver of the vehicle 24. The inflated airbag envelope 51 provides a soft surface for the driver of a vehicle to impact during a collision and distributes the occupant load to the steering wheel structure. This aspect of the steering wheel and airbag combination is well known in the art and forms no portion of the invention herein.

The modular steering wheel and airbag combination of the present invention also includes a hub plate 60. Hub plate 60 conforms generally to the size of ring portion 36 and includes a plurality of holes 62 disposed at spaced points adjacent the periphery of hub plate 60. Hub plate 60 attaches to ring portion 36 and opposed ends of spokes 34. Holes 62 correspond to the threaded holes 38 at the opposed ends of spokes 34. Bolts 40 pass through corresponding holes 62 and are threadably received in threaded holes 38 of steering wheel armature 30. Hub plate 60 also includes a structure 64 for securing the steering wheel and airbag combination 20 to a steering column shaft 22, described in detail below. Hub plate 60 also includes a plurality of fingers or pins 66 adjacent opposed lateral edges of the hub plate which correspond to the number of tabs of outer airbag cover 44 and inner airbag cover 48. Fingers or pins 66 terminate in bores 70 of ring portion 36. Hub plate 60 additionally includes a plurality of holes 63 which receive fasteners 61 for attachment of airbag component 50 to hub plate 60, described in further detail below.

Figure 3:
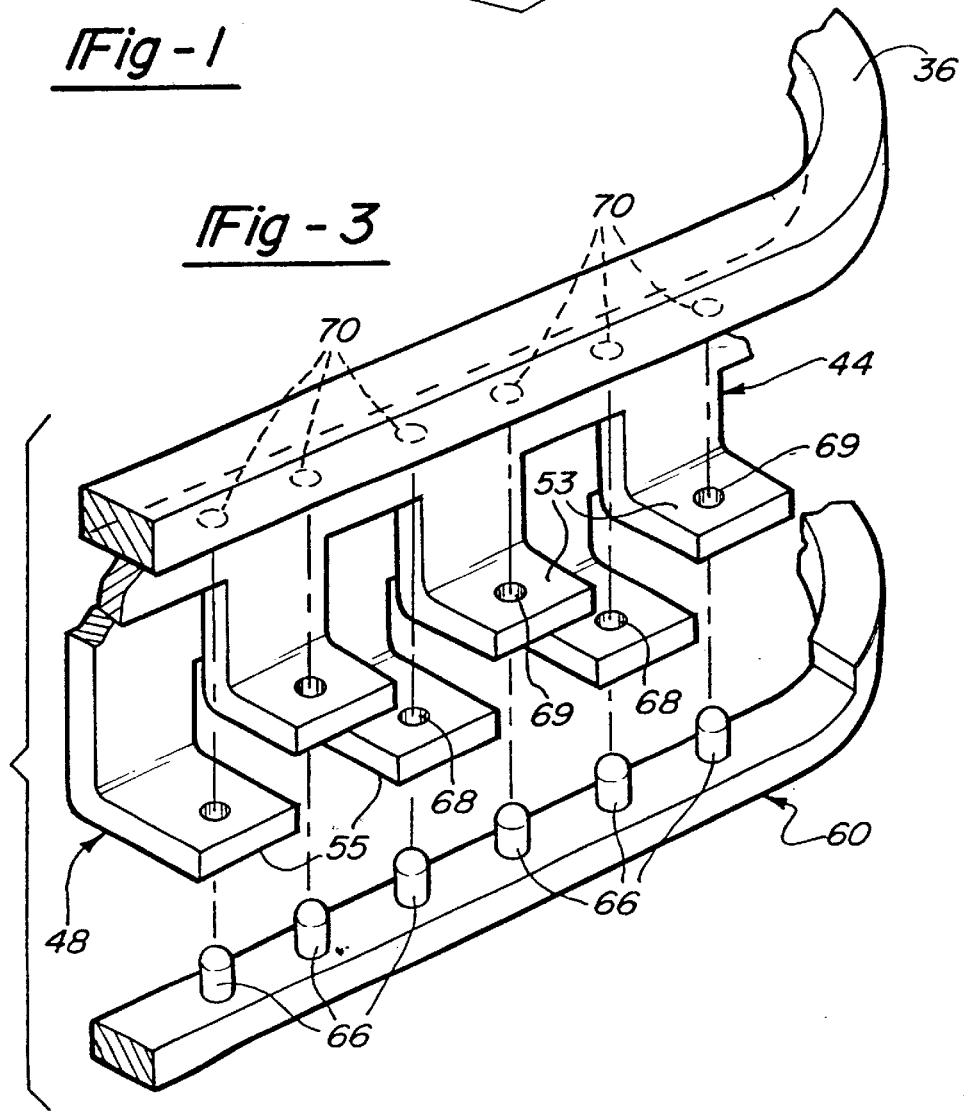
FIG. 3 is a partial, perspective, exploded view of a modular steering wheel and airbag combination showing a retention feature for the airbag covers.

As shown in FIG. 3, tabs 53 and 55 of outer and inner airbag covers 44 and 48, respectively, are captured between hub plate 60 and lower ring portion 36 of steering wheel armature 30. During activation of the airbag mechanism, airbag inflator 52 inflates airbag envelope 51 to a maximum size. Airbag envelope 51 bursts through inner airbag cover 48, horn switch 46 and outer airbag cover 44 toward the driver of vehicle 24. Without some method of retaining inner and outer airbag covers 48 and 44 within airbag assembly 42, parts of inner airbag cover 48 and outer airbag cover 44 and horn switch 46 might be expelled with inflated airbag envelope 51. Tabs 53 and 55 of outer and inner airbag covers 44 and 48, respectively along with tabs on one side of horn switch 46, are thus clamped in an interlocking fashion between lower ring portion 36 of steering wheel armature 30 and hub plate 60 to prevent the inner and outer airbag covers 48 and 44 from being expelled with the inflated airbag envelope 50 during activation of the airbag mechanism. Each tab 55 of inner airbag cover 48 has a hole 68 through which alternate fingers 66 pass. Likewise, tabs 53 of outer airbag cover 44 each have a hole through which the remaining fingers or pins 66 pass. Tabs 53 and 55 of outer and inner airbag covers 44 and 48, respectively, are offset by a distance such that when positioned between ring portion 36 and hub plate 60, inner airbag cover 48 is positioned within outer airbag 44, fingers or pins 66 pass through holes 68 and 69 with a free end of each finger 66 disposed in a bore 70 in lower ring portion 36.

Figure 4:
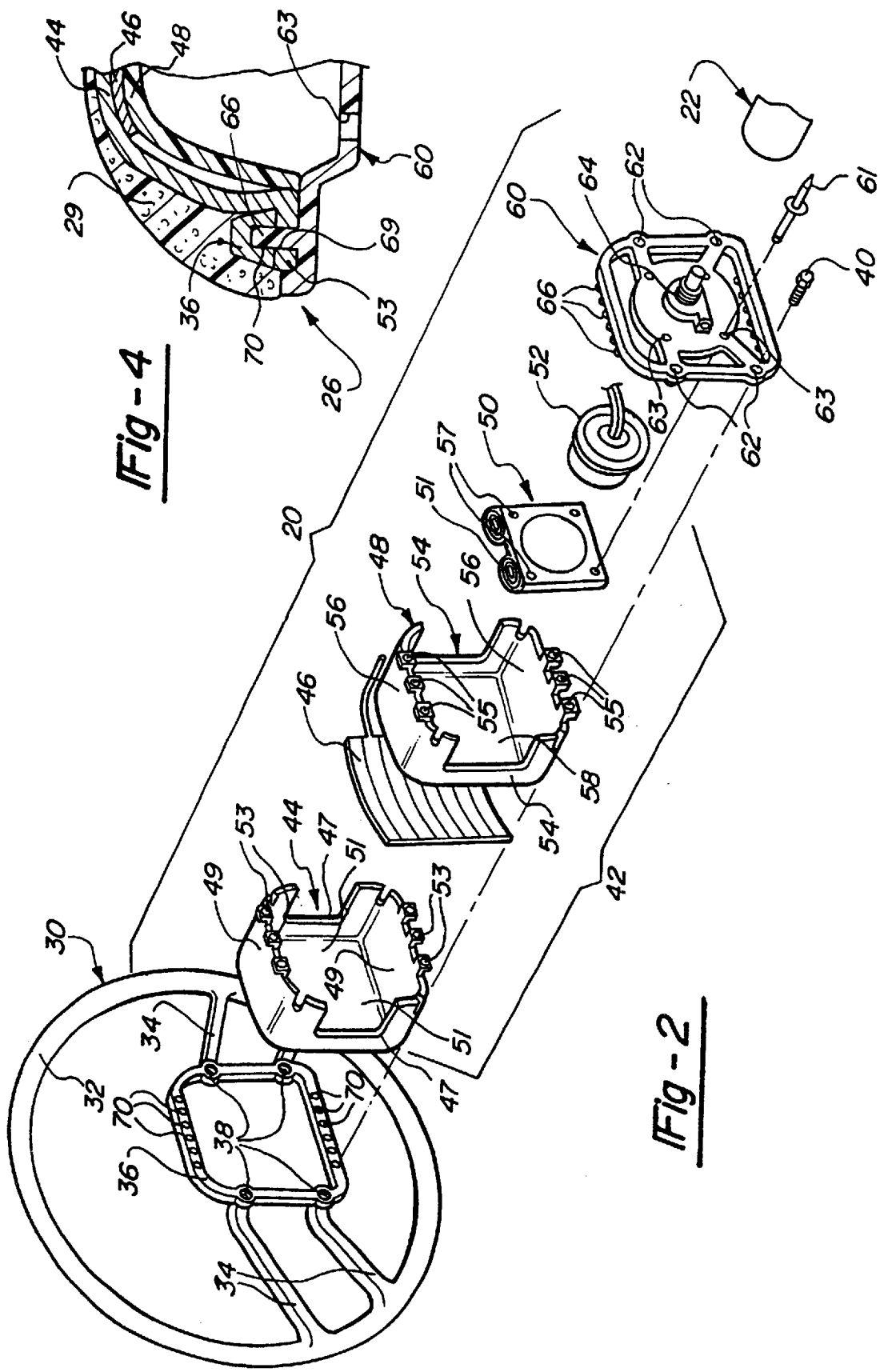
FIG. 4 is a partial, cross-sectional view of a modular steering wheel and airbag combination.

As shown in FIG. 4, horn switch 46 is disposed between inner airbag cover 48 and outer airbag cover 44. Outer cover 29 overlays outer airbag cover 44. Finger 66 extends from hub plate 60 passing through tab 53 of outer airbag cover 44. Finger 66 terminates in bore 70 of ring portion 36 of steering wheel armature 30. Thus, when the airbag mechanism is activated airbag envelope 51 bursts through inner airbag cover 48, horn switch 46, outer airbag cover 44 and outer covering 29. The clamping of tabs 53 between ring portion 36 and hub plate 60, together with fingers 66 passing through holes 69 in tabs 53 of outer airbag cover, prevent outer airbag cover 44 from being expelled with airbag envelope 51. Likewise, tabs 55 of inner airbag cover 48 are clamped between ring portion 36 and hub plate 60 with fingers 66 passing through holes 68 of tabs 55 of inner airbag cover 48, thereby preventing inner airbag cover 48 from being expelled with airbag envelope 51.

Figure 5:
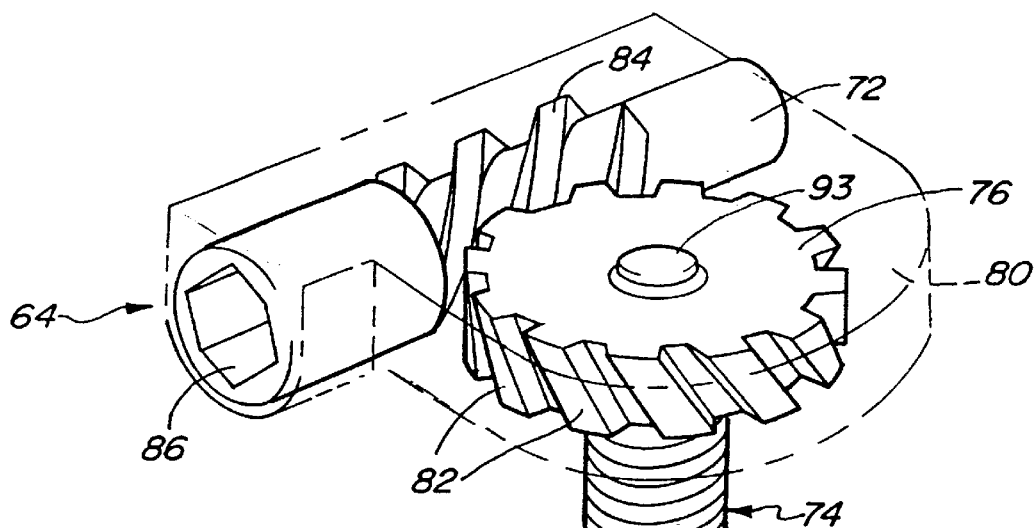
FIG. 5 is a perspective view of a structure for connecting a steering wheel and airbag combination to a steering column shaft.

As shown in FIGS. 5 and 6A, the structure for securing the steering wheel and airbag combination to the shaft of a steering column 22 may comprise a worm gear 72 and helical gear 74 combination. Helical gear 74 includes a gear portion 76 and a threaded shaft portion 78. Threaded shaft portion 78 of helical gear 74 extends from a face of gear portion 76. A plurality of gear teeth 82 are formed at a single straight angle around the periphery of gear portion 76 of helical gear 74. Worm gear 72 and gear portions 76 of helical gear 74 lie in a channel 80 of hub plate 60. Channel 80 lies in a plane defined by hub plate 60. Worm gear 72 includes a spiral gear tooth 84 which is adapted to drive gear portion 76 and, thus, rotate helical gear 74 along a longitudinal axis A of shaft 78. Worm gear 72 is actuated by inserting a drive mechanism (not shown) into bore 86 of worm gear 72 and rotating worm gear 72. Bore 86 is accessible from outside the assembled hub plate and steering wheel assembly. Bore 86 may be designed to require a special tool drive end to deter theft of steering wheel and airbag combination 20. The rear face of steering wheel and airbag combination 20 may be covered with a back cover, once the combination is attached to a steering column. Rotation of worm gear 72 in a first direction causes helical gear 74 to rotate about axis A. Shaft 78 of helical gear 74 is received in a threaded bore 88 of steering column shaft 22. Thus, when worm gear 72 is actuated, helical gear 74 rotates about axis A and shaft 78 is threadably driven into bore 88 to secure steering wheel and airbag combination 20 to steering column shaft 22.

As shown in FIG. 6A, hub plate 60 includes a collar 90 which extends from a lower face 65 of hub plate 60. An inner surface 92 of collar 90 engages a tapered outer surface 94 of steering column shaft 22 as threaded shaft 78 of helical gear 74 engages threaded bore 88 of steering column shaft 22. Inner surface 92 will engage tapered surface 94 where the inner diameter of collar 90 equals the outer diameter of steering column shaft 22. As the engagement between gear 74 and threaded bore 88 drives hub plate 60 onto shaft 22, inner surface 92 is forced onto tapered surface 94 where the outer diameter of tapered surface 94 is larger than the inner diameter of collar 90. This creates a wedge or press fit between collar 90 and steering column shaft 22. The engagement of inner surface 92 of collar 90 with tapered surface 94 of steering column shaft 22 creates a wedge lock between hub plate 60 and steering column shaft 22. This wedge lock maintains hub plate 60 and, thus, steering wheel and airbag combination 20 on steering column shaft 22 even if gear 74 were to become loose.

When it is desired to remove the wheel from the shaft 22, the worm gear 72 is rotated in the reverse direction that is used to tighten the helical gear 76. When the helical gear 76 is turned in that direction, it will move axially upwardly as shown in FIG. 6A, and portion 93 will abut air bag assembly 42. This provides a reaction surface and assists in moving hub plate 60 and collar 90 upwardly to break the wedge lock between collar 90 and shaft 22.

As shown in FIG. 6B, the connection between hub plate 60 and spokes 34 of steering wheel armature 30 includes a wedge lock feature which provides axial clamping between steering wheel armature 34 and hub plate 60. Hub plate 60 includes a plurality of nubs 121 having a frusto-conical cross-section adjacent each opening 62. Spokes 34 of steering wheel armature 30 each have a seating surface 120 which receives nub 121. Seating surfaces 120 are adjacent threaded holes 38 in the opposed ends of spokes 34 of steering wheel armature 30. The taper on nubs 121 does not correspond exactly to the taper in seating surfaces 120. The maximum diameter of seating 120 is less than the maximum width of nub 121. Thus, when bolts 40 are threadably received in bores 38 and securely tightened, nubs 121 are forced into seating surfaces 120 creating a wedge between seating 120 and nub 121. This provides secondary clamping between steering wheel armature 30 and hub plate 60. In the event hub bolts 40 become loose or are removed, axial clamping between nub 121 and seating 120 prevents steering wheel armature 30 from being displaced from hub plate 60. The steering wheel and airbag combination of the present invention may also be assembled without any wedge lock between the steering wheel armature 30 and hub plate 60. Also, the wedge lock may be reversed with nubs on the armature and the seatings on the hub.

FIG. 6C shows an alternative structure for securing combination 20 to a steering column shaft 22. Helical gear 174 includes gear portion 76 and a threaded collar portion 178. Threaded collar portion 178 extends from a face of gear portion 76 and includes a threaded inner surface 180. Steering column shaft 22 has a threaded outer surface which threadably receives threaded collar 178 of helical gear 174. As with the helical gear shown in FIGS. 5 and 6A, actuation of worm gear 72 rotates helical gear 174 with threaded collar 178 about axis A. Threaded collar 178 is threadably driven over threads 188 of steering column shaft 22 to secure steering wheel and airbag combination 20 onto steering column shaft 22. Hub plate 60 associated with worm gear 72 and helical gear 174 with threaded collar 178 may include a collar which forms the wedge lock feature with steering column shaft 22, as described above.

Figure 7:
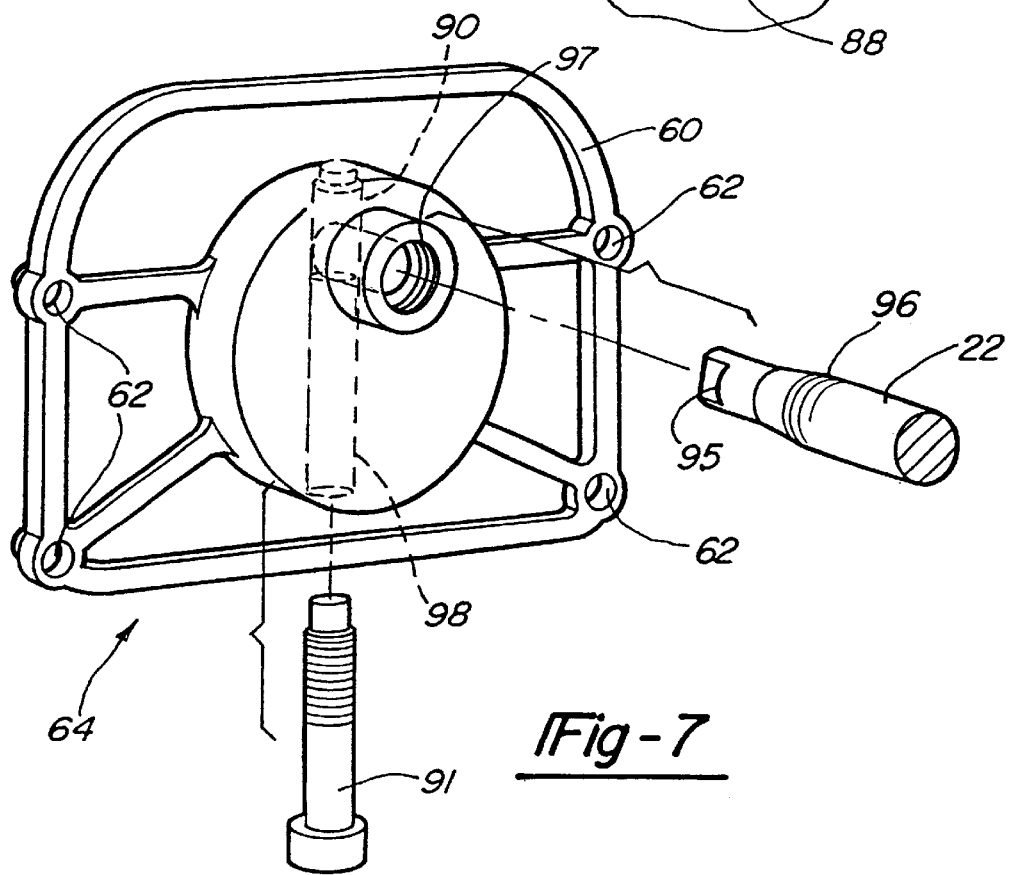
FIG. 7 is a perspective view of an alternative structure for connecting a steering wheel and airbag combination to a steering column shaft.

As shown in FIGS. 7 and 8, an alternative connection between steering column shaft 22 and hub plate 60 includes a locking bolt 91. Hub plate 60 includes a collar 90 extending from a face of the hub plate 60 remote from the exposed surface of the steering wheel and airbag combination 20. Collar 90 has a threaded bore 97 which threadably receives threaded portion 96 of steering column shaft 22. Hub plate 62 also has a second threaded bore 98 which is essentially perpendicular to threaded bore 94. Threaded bore 98 threadably receives locking bolt 91.

In another alternative method of securing a steering wheel and airbag combination 20 to a steering column shaft, the steering wheel and airbag combination 20 is positioned over a steering column shaft 22. The free end of steering column shaft 22 is inserted into bore 97. Threaded bore 97 of collar 90 threadably receives threaded portion 96 of steering column shaft 22. Tapered portion 94 of steering column shaft 22 engages inner surface 93 of collar 90, partially forming the wedge lock described above. Steering wheel and airbag combination 20 is then rotated to a predetermined stop position. Threaded portion 95 of collar 90 and threaded portion 96 of steering column shaft 22 are designed to provide a desired number of rotations of steering wheel and air bag combination 20 to reach the predetermined stop position. Threaded portions 95 and 96 cooperate to provide the wedge lock between steering column shaft 22 and hub plate 60. At the predetermined stop position, notch 95 of steering column shaft 22 faces bore 98 of hub plate 60. Locking bolt 91 is then inserted into bore 98 and securely tightened. Locking bolt 91 also provides a clamping force holding hub plate 60 onto steering column shaft 22 and, thus, prevents hub plate 60 and steering wheel and airbag combination 20 from rotating relative to steering column shaft 22 and loosening.

Figure 10:
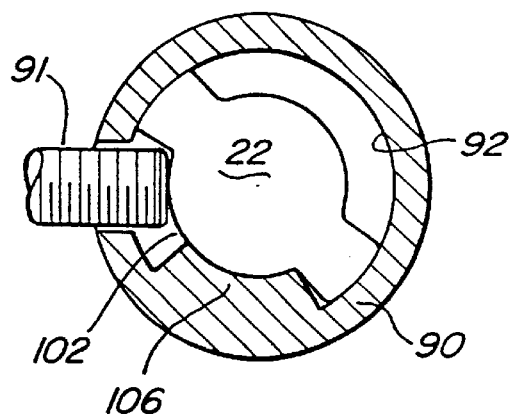
FIG. 10 is a partial, cross-sectional view of an alternative structure for connecting a steering wheel and airbag combination to a steering column shaft along view lines 10—10 in FIG. 9A.

As shown in FIGS. 9A and 10, another alternative connection between steering wheel and airbag combination 20 and steering column shaft 22 includes a bayonet-type mechanism between hub plate 60 and steering column shaft 22. An opposed end of steering column shaft 22 includes a circumferential spiral groove 102 and a ridge 104. Groove 102 extends from a free end 103 of steering column shaft 22 to tapered outer surface 94. Groove 102 terminates at a stop position disposed between ridge 104 and tapered surface 94. Hub plate 60 includes a collar 90 having a bore 92 which receives steering column shaft 22. Hub plate 60 also includes a tooth 106 adjacent the apex of bore 92. Steering column shaft 22, including free end 103 is received in bore 92 of hub plate 60. Tooth 106 slides into groove 102 beginning at a point adjacent free end 103 of steering column shaft 22. Steering wheel and airbag combination is then rotated and tooth 106 slides along groove 102 toward the stop position adjacent ridge 104. As tooth 106 slides along groove 102, the wedge lock feature described above is formed between tapered surface 94 of steering column shaft 22 and the inner surface of bore 92 of hub plate 60. At the stop position, locking bolt 91 is inserted into bore 98 and securely tightened against steering column shaft 22 as described above.

FIG. 9A also shows retainer ring 108 of airbag component 50. Hub plate 60 includes a seat 110 for airbag inflator 52. Airbag component 50 is disposed over airbag inflator 52 such that airbag envelope 51 surrounds inflator 52. Airbag retainer ring 108 is provided as part of airbag component 50 within airbag envelope 51. When inflator 52 is activated, a very large force (upward in FIG. 9) is produced, tending to dislocate airbag component 50 from hub plate 60. Retainer ring 108 maintains inflator 52 in seat 110 of hub plate 60 and prevents airbag component 50 from being pushed off hub plate 60 from the force provided by inflator 52. Retainer ring 108 also seals inflation gases within envelope 51 and prevents leakage of these gases, thus ensuring proper airbag filling. Airbag inflator 52 has a lip 112 which extends from the periphery of inflator 52 at its base. Airbag ring 108 overlays lip 112 and is disposed around the periphery of inflator 52 adjacent lip 112. A plurality of fasteners 61 pass through holes 63 in hub plate 60 and ultimately through airbag envelope 51 and ring 108. In one embodiment fasteners 61 comprise pop rivets. Airbag inflator 52 is positioned in seat 110 of hub plate 60. Airbag component 50 is disposed over inflator 52 with ring 108 positioned over lip 112 of inflator 52. Pop rivets 61 are inserted through holes 63 and holes 57 of ring 108. Pop rivets 61 are then fastened and securely positioned to maintain ring 108 and airbag component 50 in position, particularly during activation of airbag inflator 52.

FIG. 9B shows an alternative airbag assembly including bolts 130 which protrude from a lower face 65 of hub plate 60. An airbag retainer ring 128 is provided as part of airbag component 50 within airbag envelope 51. In this embodiment, ring 128 has a curve or wave which provides additional clamping strength. Bolts 130 pass through holes 157 of ring 128, airbag envelope 51 and holes 63 of hub plate 60. Nuts 132 are threadably received over bolts 130 and securely tightened. Initially, the ring only contacts airbag envelope 51 at a wave portion 129 of retainer ring 128. As nuts 132 are tightened, the head of bolt 130 clamps down on retainer ring 128 until ring 128 lays essentially flat over airbag envelope 51. Lip 112 of airbag inflator 52 sits in seat 110 of hub plate 60 and is held securely in place by bolts 130 and ring 128. This ensures a relatively uniform clamping force over the entire periphery of ring 128 with only four spaced bolts. The wave may be designed to extend along a catenary curve selected to optimize performance. Alternatively, manufacturing tolerances may make idealized design of the wave of no significance.

FIG. 11 shows one method of forming a steering wheel assembly in accordance with the present invention. An outer airbag cover 44 is inserted into ring portion 36 of steering wheel armature 30 such that tabs 53 of outer airbag cover 44 abut ring portion 36. Steering wheel armature 30 and outer airbag cover 44 are then inserted into a mold 130 corresponding to the desired steering wheel configuration. Urethane or other suitable resin is then injected into mold 130 from a source of suitable resin 132. Urethane fills reaction injection mold 130 covering upper rim portion 32, spokes 34 and outer airbag cover 44. Lower ring portion 36, opposed ends of spokes 34 and tabs 53 should not be covered with urethane to allow for easy access of ring portion 36 and tabs 53 during attachment of a hub plate assembly to the steering wheel assembly. In this way, a steering wheel assembly 132 is provided having a resin covering 134 and a smooth outer surface 29. Resin covering 134 is preferably integral with outer airbag cover 44. Outer airbag cover provides reinforcement to resin cover 134 and helps prevent fragmentation of resin cover 134 during deployment of the airbag. Tear seams are preferably formed in resin cover 134 to facilitate deployment of the airbag.

FIG. 12 shows an alternative method of forming steering wheel assembly 132. In this method, the outer covering 134 of steering wheel assembly 132 is simultaneously molded with an outer airbag cover 44 in injection mold 130. Thus, outer airbag cover 44 is integrated with the exterior surface of the steering wheel. Steering wheel armature 30 is positioned in injection mold 130. Suitable thermoplastic resin is injected from resin source 136. Lower ring portion 36 is left exposed and tabs 53 are formed during the injection molding process for further attachment to a hub plate assembly.

Figure 14:
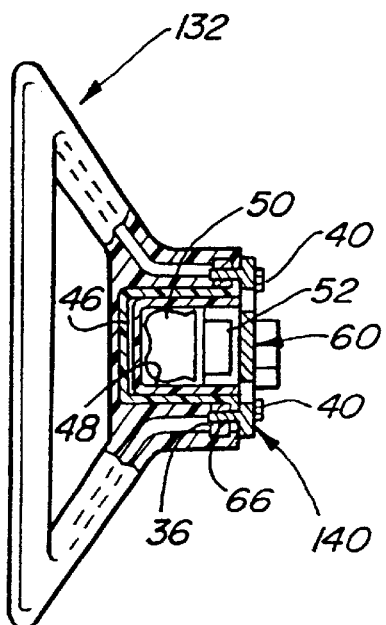
FIG. 14 shows an assembly of a steering and airbag combination.
Figure 13:
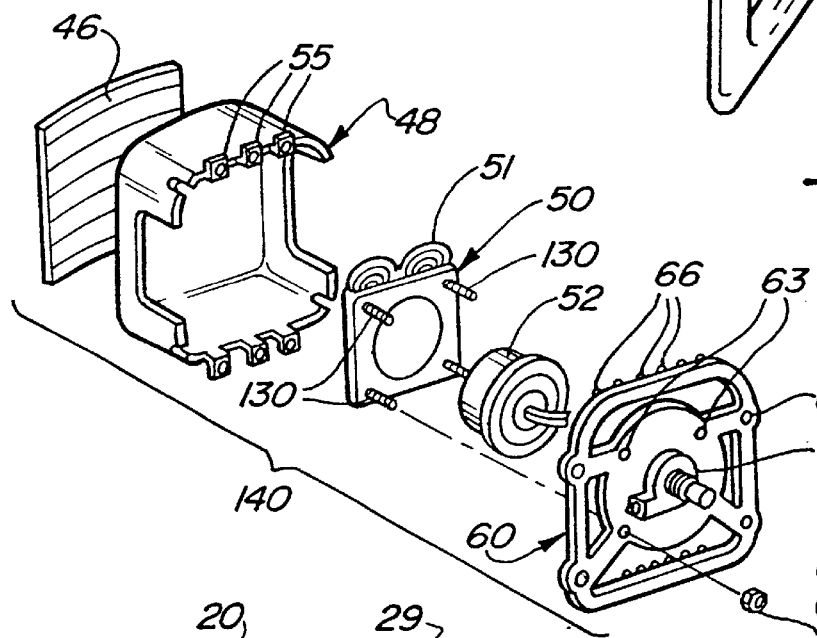
FIG. 13 shows a method of forming a hub plate sub-assembly.
Figure 15:
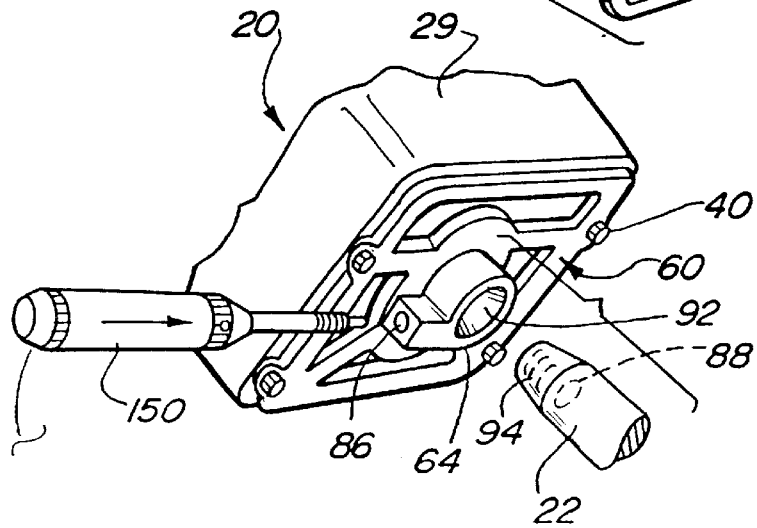
FIG. 15 shows a method of securing a steering wheel and airbag combination to a steering column shaft.

FIGS. 13–15 illustrate a method of assembling a modular steering wheel and airbag combination and a method of securing the combination to a steering column shaft. FIG. 13 illustrates a method of forming a hub plate sub-assembly 140. Airbag inflator 52 is positioned on hub plate 60. Airbag component 50 with weld stud bolts 130 is then disposed over inflator 52. Bolts 130 are passed through holes 63 of hub plate 60. Airbag component 50 is then secured to hub plate 60 by securely tightening nuts 132 over bolts 130. As nuts 132 are tightened, ring 128 disposed in airbag component 50 clamps down on airbag envelope 51, as described above. Inner airbag cover 48 is positioned over airbag component 50 with tabs 55 positioned over fingers 66 of hub plate 60. Fingers or pins 66 extend through holes 68 of inner airbag cover 48. Horn switch 46 is then positioned over inner airbag cover 48. Horn switch 46 is adjacent wall 58 of inner airbag cover 48.

As shown in FIG. 14, hub plate subassembly 140 is attached to steering wheel assembly 132. Horn switch 46 and inner airbag cover 48 are positioned within outer airbag cover 44 of steering wheel subassembly 132. Thus, outer airbag cover 44 surrounds inner airbag cover 48. Walls 54 and 56 of inner airbag cover 48 are adjacent, respectively, walls 47 and 49 of outer airbag cover 44. Horn switch 46 is disposed between wall 58 of inner airbag cover 48 and wall 51 of outer airbag cover 44. Tabs 55 of inner airbag cover 48 interlock with tabs 53 of outer airbag cover 44. Alternate fingers 66 of hub plate 60 pass through holes 69 of tabs 53. Fingers or pins 66 terminate in bores 70 of ring portion 36. Bolts 40 are then inserted through holes 62 and threadably received in threaded bores 38 of steering wheel armature 30.

As shown in FIG. 15, steering wheel and airbag combination 20 is then positioned onto steering column shaft 22. Steering wheel and airbag combination 20 includes a smooth, single piece outer covering 29 which faces the driver of a vehicle and structure for securing the combination to steering column shaft 22 remote from outer covering 29. A tool 150 is then inserted into combination 20 engaging structure 64. As mentioned above, area 86 of the worm gear is accessible for receiving tool 150 and can be designed with a special shape to deter theft. The method then includes driving tool 150 to actuate gear set structure 64, securing 64 to steering column shaft 22. Tool 150 rotates worm gear 72 which rotates gear 74 about axis A. Threaded portion 74 is threadably received in threaded bore 88, securing hub plate 60 and, thus, steering wheel and airbag combination 20 to steering shaft 22.

In another embodiment, structure 64 comprises hub plate 60 and locking bolt 91 shown in FIGS. 7 and 8 and steering column shaft 22 includes threaded portion 96. In this method, hub plate 60 of steering wheel and airbag combination 20 is positioned over steering column shaft 22 and rotated to a predetermined stop position. Bolt 91 is then inserted into threaded bore 98 and tool 150 securely tightens locking bolt and threaded bore 98.

In another alternative embodiment, structure 64 comprises hub plate 60 and locking bolt 91 shown in FIGS. 9 and 10, and steering column shaft 22 includes groove 120 and ridge 104. Hub plate 60 and steering wheel and airbag combination are positioned over steering column shaft 22. Tooth 106 of hub plate 60 moves along groove 102 while steering wheel and airbag combination 20 is rotated onto shaft 22. When tooth 106 reaches predetermined stop position of groove 102, locking bolt 91 is inserted into threaded bore 98 of hub plate 60 into recess on opposite side of casting. This puts locking bolt 91 in double shear. Tool 150 rotates locking bolt 91, which is threadably received in threaded bore 98. Tool 150 securely tightens locking bolt 91 in threaded bore 98.

FIG. 16 shows another embodiment 200. In embodiment 200 an armature 202 is secured to a steering column 204 by a bolt 206 as in the prior embodiments. A worm gear 208 is driven by a worm 210 to secure the bolt 206 to the steering column 204.

As shown in FIG. 17, the worm gear 208 is preferably a relatively thin steel member formed with gear teeth. A central cylindrical portion 213 is secured to bolt 206 such that the two rotate together. In addition, a screw 212 can also be utilized to secure the worm gear 208 to the bolt 206.

The worm gear 208 includes a base structure 215 which abuts an upper end of a hub 214 of the armature 202. As further shown, a support plate 216 for the worm 210 is to be secured to the armature structure 202 in some fashion.

A preferred description of this invention has been disclosed; however, a worker of ordinary skill in the art would recognize that certain modifications would come within the scope of this invention. For that reason, the following claims should be studied in order to determine the true scope and content of this invention.

What is claimed is:

1. A modular steering wheel and airbag combination comprising:
    a steering wheel assembly;
    an airbag assembly secured to said steering wheel;
    wherein said steering wheel assembly includes a hub plate, a worm gear and a complementary gear, said worm gear adapted to drive said complementary gear such that said complementary gear secures said combination to a steering column shaft.

2. The modular steering wheel and airbag combination as recited in claim 1, wherein said complementary gear includes a threaded shaft which protrudes from a rear face of said combination to be threadably received in a threaded bore of the steering column shaft.

3. The modular steering wheel and airbag combination as recited in claim 1, wherein said complementary gear comprises a helical gear having a gear portion and a threaded shaft extending from a face of said gear portion and protruding from a rear face of said hub plate, said worm gear adapted to rotate said helical gear along a longitudinal axis of said threaded shaft, and the steering column shaft including a threaded bore which threadably receives said threaded shaft.

4. The modular steering wheel and airbag combination as recited in claim 3, wherein said hub plate is formed separately from a wheel portion of said steering wheel assembly, said hub plate including a collar extending from an opposed face of said hub plate and disposed around said threaded shaft and the steering column shaft having a tapered portion at an opposed end of said steering column shaft, wherein an inner diameter of said collar is less than a maximum width of the steering column shaft along the tapered portion, thereby forming a wedge lock between said collar and the steering column shaft.

5. The modular steering wheel and airbag combination as recited in claim 4, wherein said helical gear includes a nub extending from a face of said gear portion remote from said threaded shaft, wherein rotation of said worm gear to disengage said helical gear from the steering column shaft causes said nub to contact said airbag assembly, thereby forcing said collar and said hub plate away from the steering column shaft and disengaging said wedge lock.

6. The modular steering wheel and airbag combination as recited in claim 1, wherein said hub plate has a collar extending from a face, said worm gear and said complementary gear disposed in a channel of said hub plate, said complementary gear having a gear portion and a threaded shaft extending from said gear portion, said worm gear adapted to rotate said complementary gear along a longitudinal axis of said shaft with said worm gear and said gear portion of said complementary gear disposed in a plane defined by said hub plate.

7. The modular steering wheel and airbag combination as recited in claim 1, wherein said complementary gear comprises a helical gear having a gear portion and a threaded collar extending from a face of said gear portion and protruding from a rear face of said combination, said worm gear is adapted to rotate said helical gear along a longitudinal axis of said threaded collar, and a steering column shaft includes a threaded outer surface which threadably receives said threaded collar.

8. A modular steering wheel and airbag combination as recited in claim 1, wherein said complimentary gear is a thin gear toothed member.

9. The modular steering wheel as recited in claim 1, wherein said complimentary gear is secured to a threaded bolt member which protrudes from a rear face of said combination to be threadably received in a threaded bore of a steering column shaft.

10. A modular steering wheel and airbag combination comprising;

a steering wheel assembly including a hub plate, said hub plate having a central aperture and a channel deposed adjacent said central aperture, a complementary gear having gear teeth at an outer peripheral surface at one axial end, and a threaded shaft extending towards a second axial end and protruding through said aperture of said hub plate, a worm gear received in said channel and having teeth engaged with said teeth of said complementary gear;

an airbag assembly affixed to said hub plate; and a plastic cover integrally molded to said steering wheel and over said airbag assembly.

11. The modular steering wheel and airbag combination as recited in claim 10, wherein said complementary gear is a helical gear, said helical gear including a nub extending from a face of said gear portion remote from said threaded shaft, wherein upon rotation of said worm gear to disengage said helical gear from a steering column shaft, said nub moves to contact said airbag assembly, thereby forcing said hub away from a steering wheel shaft.

* * * * *

UNITED STATES PATENT AND TRADEMARK OFFICE
CERTIFICATE OF CORRECTION

PATENT NO.     : 6,371,507 B1                                                Page 1 of 1
DATED          : April 16, 2002
INVENTOR(S)    : Durrani et al.

It is certified that error appears in the above-identified patent and that said Letters Patent is hereby corrected as shown below:

<u>Title page,</u>
Item [*], Notice, delete "0" and insert -- 667 --.

Signed and Sealed this

Twenty-fourth Day of June, 2003

JAMES E. ROGAN
*Director of the United States Patent and Trademark Office*